United States Patent [19]

Hamaguchi et al.

[11] Patent Number: 4,964,949

[45] Date of Patent: Oct. 23, 1990

[54] DEINKING COMPOSITION FOR RECLAMATION OF WASTE PAPER

[75] Inventors: Koji Hamaguchi; Fumihiko Togashi; Yoshitaka Miyauchi, all of Wakayama, Japan

[73] Assignee: Kao Corporation, Tokyo, Japan

[21] Appl. No.: 211,172

[22] Filed: Jun. 22, 1988

Related U.S. Application Data

[63] Continuation of Ser. No. 33,426, Apr. 1, 1987, abandoned.

[30] Foreign Application Priority Data

Apr. 11, 1986 [JP] Japan .................. 61-83419
Dec. 24, 1986 [JP] Japan ................. 61-313874

[51] Int. Cl.$^5$ ............................. D21C 5/02
[52] U.S. Cl. ......................... 162/5; 252/60; 252/61
[58] Field of Search ............... 162/5; 252/60, 61

[56] References Cited

FOREIGN PATENT DOCUMENTS

| | | |
|---|---|---|
| 53-31804 | 3/1978 | Japan .................. 162/5 |
| 58-109696 | 6/1983 | Japan .................. 162/5 |
| 58-149394 | 9/1983 | Japan .................. 162/5 |
| 59-09299 | 1/1984 | Japan .................. 162/5 |
| 59-30978 | 2/1984 | Japan .................. 162/5 |
| 59-59990 | 4/1984 | Japan .................. 162/5 |
| 60-239585 | 11/1985 | Japan .................. 162/5 |
| 60-239586 | 11/1985 | Japan .................. 162/5 |

*Primary Examiner*—Steve Alvo
*Attorney, Agent, or Firm*—Flynn, Thiel, Boutell & Tanis

[57] ABSTRACT

A deinking composition is used for reclamation of waste paper and comprises (a) an alkylene oxide adduct to a mixture of a natural oil or fat and a polyhydric alcohol and (b-1) an alkylene oxide adduct of a higher alcohol, (b-2) a sulfate of (b-1) or (b-3) a higher fatty acid.

7 Claims, No Drawings

DEINKING COMPOSITION FOR RECLAMATION OF WASTE PAPER

This application is a continuation of U.S. Ser. No. 033,426, filed Apr. 1, 1987, now abandoned.

The present invention relates to a deinking agent used for the reclamation of waste paper such as newspapers or magazines. More particularly, the invention relates to a deinking agent used in the reclamation of waste paper such as newspapers or magazines by the flotation method to obtain deinked pulp having a high degree of whiteness and low residual ink droplet number.

Newspapers and magazines have been reclaimed for reuse from old times and, recently, their reclamation becomes more important and extensive use of deinked pulp is highly demanded. On the other hand, the deinking of recent waste paper is quite difficult because of changes in the printing techniques, printing systems and printing ink compositions. Under these circumstances, deinking devices have also been improved variously to enhance the efficiency.

Chemicals used for separating and removing ink and other impurities from waste paper in the prior art include alkalis such as sodium hydroxide, silicate and phosphate; bleaching agents such as hydrogen peroxide, hyposulfites and hypochlorites; and sequestering agents such as DTPA and EDTA. In combination with these chemicals, deinking agents are used, which include anionic surfactants such as alkylbenzenesulfonates, higher alcohol sulfate salts, α-olefinsulfonates and dialkyl sulfosuccinates; and nonionic surfactants such as, ethylene oxide adducts of higher alcohols, alkylphenols and fatty acids, ethylene oxide/propylene oxide adducts and alkanolamides. These agents are used either alone or in the form of a mixture of two or more of them. However, when these deinking agents are used in the flotation method, the capacities of them for separating and removing the ink are poor. Thus, the development of a deinking agent having a high ink coagulating power has been demanded.

Though fatty acids (which form fatty acid soaps with sodium hydroxide used in the waste paper disinteration step) have been known as deinking agents having the highest deinking capacity in the flotation step, they have defects that (1) when they are used in the treatment of waste newspapers and magazines, the ink released from the waste paper deposits on the surface of the device to cause troubles, (2) the foamability of them in the flotation step is very low and, therefore, suspended coagulated ink cannot be removed sufficiently and ink spots remaining in the obtained pulp cause troubles in the subsequent steps and (3) the fatty acids are required in an amount far larger than those of anionic surfactants and nonionic surfactants for obtaining the intended effects and, therefore, the chemical costs are high.

SUMMARY OF THE INVENTION

A purpose of the invention is to present a deinking agent that overcomes the above shown defects. The deinking composition according to the invention has a high capacity of releasing the ink from waste paper and can remove the released ink from the pulp fibers by adsorption on forms in the flotation treatment step to form deinked pulp having a high degree of whiteness and a low residual ink droplet number and unreleased ink droplet number.

A deinking composition of the invention is useful for reclamation of waste paper and comprises (a) a reaction product obtained by adding one or more alkylene oxides to a mixture of a natural oil or fat and a polyhydric alcohol and (b) a compound selected from the group consisting of (b-1) an alkylene oxide adduct of a higher alcohol having the formula (1):

R—O(AO)$_n$H            (1)

in which R is an alkyl or alkenyl having 12 to 18 carbon atoms, AO are units derived from one or more alkylene oxides having 2 to 4 carbon atoms and n is 5 or more on the average, (b-2) a sulfate of an alkylene oxide adduct of a higher alcohol having the formula (2):

R'—O(A'O)$_m$SO$_3$M            (2)

in which R' is an alkyl or alkenyl having 10 to 18 carbon atoms, AO are units having 2 to 4 carbon atoms, m is from 0.3 to 5 on the average and M is hydrogen, an alkali metal or ammonium, mixtures of (b-1) and (b-2) and (b-3) a higher fatty acid having 8 to 22 carbon atoms or a salt thereof.

It is preferred that the weight ratio of (a) to (b) ranges from 99/1 to 30/70.

It is preferred that said reaction product (a) is a product obtained by adding 5 moles or more of an alkylene oxide to 1 mole in total of a mixture of a natural oil or fat and a polyhydric alcohol, the molar ratio of the natural oil or fat to the polyhydric alcohol ranging from 1/0.1 to ⅓.

The invention includes two preferable embodiments. One embodiment comprises (a) and (b) selected from the group consisting of (b-1), (b-2) or mixture thereof having a weight ratio of (a) to (b) ranging from 99/1 to 50/50. The other comprises (a) and (b-3) having a weight ratio of (a) to (b-3) ranging from 95/5 to 30/70.

The invention will be explained in detail below first in respect to the first embodiment comprising (a) and (b-1) or (b-2) or mixture thereof.

The present invention provides a deinking agent for reclamation of waste paper characterized by comprising:
(a) a reaction product obtained by adding one or more alkylene oxides to a mixture of a natural oil or fat and a polyhydric alcohol and
(b) a compound of the general formula (2):

R—O(AO)$_n$H            (1)

wherein R represents an alkyl or alkenyl group having 12 to 18 carbon atoms, AO represents two or more kinds of oxyalkylene oxide groups having 2 to 4 carbon atoms and n represents a number of at least 5 on average, and

R'—O(A'O)$_m$SO$_3$M            (2)

wherein R' represents an alkyl or alkenyl group having 10 to 18 carbon atoms, A'O represents one or more oxyalkylene oxide groups having 2 to 4 carbon atoms, m represents a number of 0.3 to 5 on average and M represents H, an alkali metal or ammonium,
in a weight ratio of (a)/(b) of 99/1 to 50/50.

The natural oils and fats used in the present invention include vegetable oils such as coconut oil, palm oil, olive oil, soybeam oil, rapeseed oil and linseed oil; animal oils such as lard, beef tallow and bone oils; fish oils; and hardened and semi-hardened oils derived from them as well as recovered oils obtained in the steps of purification of these oils and fats.

The polyhydric alcohols used in the present invention include ethylene glycol, propylene glycol, trimethylene glycol, butylene glycol, glycerol, trimethylolpropane, trimethylolethane, 1,2,4-butanetriol, 1,2,6-hexanetriol, 1,1,1-trimethylolhexane, pentaerythritol, tetramethylolcyclohexanol and diglycerol.

The alkylene oxides to be added to the mixture of said natural oil or fat and polyhydric alcohol include, for example, ethylene oxide, propylene oxide and butylene oxide. The alkylene oxide adducts can be prepared by mixing the alkylene oxide with said mixture (random addition) or by the successive addition (block addition). The random addition or block addition of ethylene oxide and an alkylene oxide other than ethylene oxide are preferred.

The mixing molar ratio of the natural oil or fat to the polyhydric alcohol is 1/0.1 to ⅓, preferably 1/0.3 to ½.

The alkylene oxide is used in an amount of preferably at least 5 mol, particularly, 20 to 100 mol, per mol of the total of the natural oil or fat and polyhydric alcohol. When the amount of the alkylene oxide is less than 5 mol, the power of releasing the ink from the waste paper, ink-scavenging capacity and foamability in the flotation step are reduced and the intended deinked pulp having a high quality cannot be obtained.

The compounds of the above general formula (1) used in the present invention are prepared by adding an alkylene oxide to an alcohol. When the alkyl or alkenyl group R in the above general formula has a carbon number outside the range of 12 to 18, the ink-releasing power, ink-scavenging capacity and foamability are reduced unfavorably. The alkylene oxide addition is preferably the random addition or block addition of ethylene oxide and an alkylene oxide other than ethylene oxide, i.e. propylene oxide or butylene oxide. The molar ratio of ethylene oxide to propylene oxide or butylene oxide is preferably 1/1 to 3/1. The number n in the above formula is at least 5 on average, preferably in the range of 20 to 100.

The compounds of the above general formula (2) used in the present invention are prepared by adding said alkylene oxide to said alcohol and sulfating the obtained adduct. When the alkyl or alkenyl group R' in the above general formula has a carbon number outside the range of 10 to 18, the foamability and ink-scavenging capacity in the flotation step are reduced. The same applies to a case wherein m exceeds 5.

It is important in the deinking agent of the present invention that the weight ratio of the component (a) to the component (b) is 99/1 to 50/50. When said ratio is outside said range, the balance of the ink-releasing power, ink-scavenging power and foamability is broken and, therefore, deinked pulp having a high quality can be obtained and the stable operation becomes difficult. When the component (b) is particularly a compound of the above general formula (1), the ratio of (a)/(b) is preferably 80/20 to 60/40. When the component (b) is a compound of the above general formula (2), the ratio of (a)/(b) is preferably 95/5 to 80/20.

The invention will be illustrated below in respect to the second embodiment comprising (a) and (b-3). The above shown (a) can be used here.

The composition comprises (a) and (b-3) a higher fatty acid having 8 to 22 carbon atoms or a salt thereof, the weight ratio to (a) to (b-3) ranging from 30/70 to 95/5, preferably from 40/60 to 70/30. When the weight ratio falls outside the range, the balance of the ink coagulation and foamability in the flotation step is broken and therefore the pulp having a high degree of whiteness and a low residual ink droplet number cannot be obtained and the stable operation becomes difficult.

It is important that the higher fatty acids used in the present invention have 8 to 22, preferably 8 to 18, carbon atoms. When the number of carbon atoms is less than 8, the ink-coagulating effects are reduced, while and when it exceeds 22, the deinking effects are reduced. Examples of the fatty acids having 8 to 22 carbon atoms include caprylic, capric, lauric, myristic, palmitic, stearic and oleic acids. The higher fatty acids include not only those having a given carbon number but also mixtures of these acids having various carbon numbers, such as beef tallow fatty acids or coconut fatty acids.

Since sodium hydroxide is used in combination with the higher fatty acids, these acids act as fatty acid soaps in the waste paper disintegration step. Therefore, the higher fatty acids may be used in the form of their salts such as sodium, potassium or ammonium salts.

Though the deinking agent of the present invention may be used in either or both of the waste paper disintegration step and the aging tower step, the maximum effects can be obtained by using it in the waste paper disintegration step.

The amount of the deinking agent is preferably 0.2 to 1.0 wt. % based on the waste paper to be treated. The deinking agent of the present invention can be used also in combination with known deinking agents conventionally used heretofore.

The following examples will further illustrate the present invention, which by no means limit the invention.

EXAMPLE 1

Components (a) having compositions shown in Table 1 (samples 1 to 10) were prepared. Then the component (a) was mixed with the component (b) shown in Table 2 in a weight ratio shown in Table 2 to obtain deinking agents.

Waste newspapers recovered in the town were cut into pieces having a size of 2×5 cm. A given amount of the pieces was placed in a bench disintegrator, to which were then added water, 1.0% (by weight based on the starting material; the same shall apply hereinafter) of sodium hydroxide, 3.0% of sodium silicate, 3.0% of a 30% aqueous hydrogen peroxide solution and 0.4% of a deinking agent shown in Table 2. After the disintegration carried out at 55° C. for 20 min while the pulp concentration was kept at 5%, aging was effected at 50° C. for 60 min. Then, the mixture was diluted with water to a pulp concentration of 1.0%, 1.0% of CaCl$_2$ was added thereto and the flotation treatment was effected at 30° C. for 10 min. After completion of the flotation, the pulp slurry was concentrated to 6%. The concentrate was diluted to 1% with water and shaped into pulp sheets with a TAPPI sheet machine.

The degrees of whiteness of the obtained pulp sheets were measured with a colorimetric color-difference meter and the residual ink droplet number and unreleased ink droplet number were determined with an image analyzer (×126). The results are summarized in Table 2.

TABLE 1

| No. | Natural oil or fat (α) | Polyhydric alcohol (β) | Molar Ratio α/β | Alkylene oxide Compound (*1) | Molar number |
|---|---|---|---|---|---|
| 1 | coconut oil | ethylene glycol | 1/1 | EO | 40 |
| 2 | palm oil | glycerol | 1/0.5 | EO | 80 |
| 3 | palm oil | glycerol | 1/0.5 | EO/PO (block) | 50/20 |
| 4 | beef tallow | glycerol | 1/1 | EO/PO (random) | 80/30 |
| 5 | beef tallow | ethylene glycol | 1/2 | EO/PO (random) | 60/40 |
| 6 | bone oil | pentaerythritol | 1/3 | EO/BO (block) | 30/15 |
| 7 | fish oil | pentaerythritol | 1/1 | EO/BO (block) | 50/30 |
| 8 | soybean oil | trimethylolethane | 1/0.5 | EO/PO (random) | 20/10 |
| 9 | soybean oil | trimethylolethane | 1/2 | EO/BO (random) | 25/5 |
| 10 | olive oil | ethylene glycol | 1/0.5 | EO | 20 |

(Note)
(*1) EO refers to ethylene oxide, PO to propylene oxide and BO to butylene oxide.

TABLE 2

| Deinking agent No. | Component (a) Oil or fat/ polyhydric alcohol/ alkylene oxide | Component (b) (b-1) $R-O(AO)_{\overline{n}}H$ | Component (b) (b-2) $R'-O(A'O)_{\overline{m}}SO_3M$ | Weight ratio (a/b) | Degree of whiteness (%) | Residual ink droplet number | Unreleased ink droplet number |
|---|---|---|---|---|---|---|---|
| Present invention | | | | | | | |
| 1 | sample 1 | $C_{12}H_{25}O(EO)_{10}(PO)_7H$ | — | 90/10 | 56.6 | 27 | 15 |
| 2 | sample 2 | $C_{14}H_{29}O[(EO)_{50}(BO)_{20}]H$ | — | 80/20 | 57.1 | 20 | 10 |
| 3 | sample 3 | $C_{18}H_{37}O(EO)_{10}(PO)_4H$ | — | 70/30 | 57.5 | 18 | 8 |
| 4 | sample 3 | $C_{18}H_{37}O(EO)_{10}(PO)_4H$ | — | 60/40 | 56.3 | 27 | 15 |
| 5 | sample 4 | $C_{18}H_{35}O(EO)_{30}(BO)_{20}H$ | — | 80/20 | 56.8 | 25 | 13 |
| 6 | sample 4 | $C_{18}H_{35}O(EO)_{30}(BO)_{20}H$ | — | 50/50 | 55.4 | 30 | 22 |
| 7 | sample 5 | $C_{16}H_{33}O(EO)_{20}(PO)_{15}H$ | — | 70/30 | 57.3 | 20 | 8 |
| 8 | sample 6 | $C_{12}H_{25}O[(EO)_{30}(BO)_7]H$ | — | 90/10 | 55.0 | 32 | 21 |
| 9 | sample 1 | — | $C_{10}H_{21}O(EO)_{0.5}SO_3Na$ | 97/3 | 55.3 | 33 | 23 |
| 10 | sample 3 | — | $C_{12}H_{25}O(EO)_1SO_3Na$ | 90/10 | 56.9 | 25 | 15 |
| 11 | sample 3 | — | $C_{12}H_{25}O(EO)_1SO_3Na$ | 80/20 | 56.7 | 27 | 16 |
| 12 | sample 6 | — | $C_{16}H_{33}O[(EO)_3(BO)_1]SO_3NH_4$ | 95/5 | 56.0 | 30 | 18 |
| 13 | sample 7 | — | $C_{12}H_{25}O(EO)_3(BO)_1SO_3K$ | 60/40 | 55.7 | 31 | 23 |
| 14 | sample 7 | — | $C_{12}H_{25}O(EO)_3(BO)_1SO_3K$ | 70/30 | 56.3 | 28 | 19 |
| 15 | sample 8 | — | $C_{18}H_{37}O(EO)_3(PO)_1SO_3K$ | 90/10 | 57.0 | 20 | 13 |
| 16 | sample 9 | — | $C_{18}H_{35}O(EO)_2SO_3Na$ | 80/20 | 56.4 | 26 | 20 |
| 17 | sample 10 | — | $C_{10}H_{21}O(EO)_1SO_3Na$ | 60/40 | 55.6 | 30 | 22 |
| 18 | sample 3 | $C_{18}H_{37}O(EO)_{10}(PO)_4H$ | $C_{12}H_{25}O(EO)_1SO_3Na$ | 80/5/15 | 56.9 | 21 | 9 |
| 19 | sample 3 | $C_{18}H_{37}O(EO)_{10}(PO)_4H$ | $C_{12}H_{25}O(EO)_1SO_3Na$ | 70/20/10 | 57.5 | 19 | 8 |
| Comparative | | | | | | | |
| 20 | sample 3 | — | — | — | 54.0 | 50 | 31 |
| 21 | sample 3 | $C_{18}H_{37}O(EO)_{10}(PO)_4H$ | — | 40/60 | 53.8 | 55 | 27 |
| 22 | sample 3 | — | $C_{12}H_{25}O(EO)_1SO_3Na$ | 30/70 | 51.2 | 82 | 35 |
| 23 | — | — | $C_{12}H_{25}O(EO)_1SO_3Na$ | — | 48.1 | 113 | 58 |
| 24 | — | $C_{18}H_{37}O(EO)_{10}(PO)_4H$ | — | — | 50.4 | 98 | 40 |
| 25 | sample 3 | $C_{18}H_{37}O(EO)_{20}H$ | — | 90/10 | 54.6 | 45 | 28 |
| 26 | sample 4 | $C_{12}H_{25}O(PO)_{10}H$ | — | 80/20 | 50.8 | 94 | 31 |
| 27 | sample 4 | $C_9H_{19}$-⬡-$O(EO)_{10}(PO)_7H$ | — | 70/30 | 53.0 | 63 | 33 |
| 28 | sample 6 | $HO(EO)_{10}(PO)_5(EO)_{10}H$ | — | 60/40 | 51.4 | 78 | 45 |
| 29 | sample 7 | — | $C_{12}H_{25}$-⬡-$O-SO_3Na$ | 80/20 | 51.8 | 72 | 47 |
| 30 | sample 1 | — | $C_{12}H_{25}OSO_3Na$ | 70/30 | 52.4 | 61 | 41 |
| 31 | $C_{17}H_{35}COOH$ | — | — | — | 50.8 | 93 | 85 |

TABLE 2-continued

| Deinking agent No. | Component (a) Oil or fat/ polyhydric alcohol/ alkylene oxide | Component (b) | | Weight ratio (a/b) | Degree of whiteness (%) | Residual ink droplet number | Unreleased ink droplet number |
| --- | --- | --- | --- | --- | --- | --- | --- |
| | | (b-1) R—O$(AO)_\overline{n}$H | (b-2) R'—O$(A'O)_\overline{m}$SO$_3$M | | | | |
| 32 | sample 6 | — | $C_9H_{19}$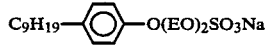—O(EO)$_2$SO$_3$Na | 80/20 | 52.6 | 58 | 38 |

(Notes)
EO refers to ethylene oxide, PO to propylene oxide and BO to butylene oxide.
[ ] represents the random adduct.

EXAMPLE 2

Waste newspapers recovered in the town were cut into pieces having a size of 2×5 cm. A given amount of the pieces was placed in a bench disintegrator, to which were then added water, 1.0% of sodium hydroxide, 0.5% of sodium silicate No. 3 and 0.4% of a deinking agent shown in Table 3. After carrying out disintegration at 45° C. for 20 min while the pulp concentration was kept at 5%, the mixture was dehydrated to a pulp concentration of 18%. 1.5% of sodium hydroxide, 2.5% of sodium silicate No. 3 and 3.0% of a 30% aqueous hydrogen peroxide solution were added thereto. After mixing them, the aging treatment was effected at 55° C. for 90 min while the pulp concentration was kept at 15%. Then, water was added thereto to adjust the pulp concentration at 4%. After disintegration on the bench disintegrator for 5 min, the mixture was diluted with water to a pulp concentration of 1.0%. 1.0% of CaCl$_2$ was added thereto and the flotation treatment was effected at 30° C. for 10 min. After completion of the flotation, the pulp slurry was concentrated to 6%. The concentrate was diluted to 1% with water and shaped into pulp sheets with a TAPPI sheet machine.

The degrees of whiteness of the obtained pulp sheets were measured with a colorimetric color-difference meter and the residual ink droplet number and unreleased ink droplet number were determined with an image analyzer (×126). The results are summarized in Table 3.

EXAMPLE 3

The component (a) was prepared to obtain samples 1 to 6 as shown in Table 4. Waste newspapers of towns prepared. Then, waste newspapers recovered in the town were cut into pieces having a size of 2×5 cm. A given amount of the pieces was placed in a bench disintegrator, to which were then added water, 1.0% (by weight based on the starting material; the same shall apply hereinafter) of sodium hydroxide, 3.0% of sodium silicate, 3.0% of a 30% aqueous hydrogen peroxide solution and 0.4% of a deinking agent shown in Table 5. After the disintegration carried out at 55° C. for 20 min while the pulp concentration was kept at 5%, aging was effected at 50° C. for 60 min. Then, the mixture was diluted with water to a pulp concentration of 1.0%, 1.0% of CaCl$_2$ was added thereto and the flotation treatment was effected at 30° C. for 10 min. After completion of the flotation, the pulp slurry was concentrated to 6%. The concentrate was diluted to 1% with water and shaped into pulp sheets with a TAPPI sheet machine. The degrees of whiteness of the obtained pulp sheets were measured with a colorimetric color-difference meter and the residual ink droplet number was determined with an image analyzer (×126). The results are summarized in Table 5.

TABLE 3

| Deinking agent No. | Component (a) Oil or fat/polyhydric alcohol/alkylene oxide | Component (b) R—O(AO)$_n$H | Component (b) R'—O(A'O)$_m$SO$_3$M | Weight ratio (a/b) | Degree of whiteness (%) | Residual ink droplet number | Unreleased ink droplet number |
|---|---|---|---|---|---|---|---|
| Present Invention | | | | | | | |
| 1 | sample 1 | C$_{12}$H$_{25}$O(EO)$_{10}$(PO)$_7$H | — | 90/10 | 55.5 | 27 | 16 |
| 2 | sample 4 | C$_{14}$H$_{29}$O[(EO)$_{50}$(BO)$_{20}$]H | — | 60/40 | 55.3 | 25 | 12 |
| 3 | sample 6 | C$_{12}$H$_{25}$O(EO)$_{30}$(PO)$_{20}$H | — | 80/20 | 56.2 | 20 | 8 |
| 4 | sample 6 | C$_{12}$H$_{25}$O(EO)$_{30}$(PO)$_{20}$H | — | 70/30 | 56.5 | 19 | 6 |
| 5 | sample 7 | C$_{18}$H$_{37}$O(EO)$_{30}$(BO)$_{20}$H | — | 80/20 | 56.3 | 23 | 10 |
| 6 | sample 7 | C$_{18}$H$_{37}$O(EO)$_{30}$(BO)$_{20}$H | — | 60/40 | 55.0 | 29 | 15 |
| 7 | sample 8 | C$_{12}$H$_{25}$O(EO)$_{20}$(PO)$_7$H | — | 50/50 | 54.2 | 35 | 22 |
| 8 | sample 9 | C$_{16}$H$_{33}$O[(EO)$_{30}$(PO)$_{10}$]H | — | 90/10 | 55.0 | 27 | 13 |
| 9 | sample 10 | C$_{16}$H$_{33}$O(EO)$_{20}$(PO)$_5$H | — | 70/30 | 54.6 | 38 | 18 |
| 10 | sample 1 | — | C$_{10}$H$_{21}$O(EO)$_{0.5}$Na | 95/5 | 54.8 | 33 | 20 |
| 11 | sample 2 | — | C$_{12}$H$_{25}$O(EO)$_2$(PO)$_{0.5}$SO$_3$K | 90/10 | 55.7 | 23 | 10 |
| 12 | sample 3 | — | C$_{18}$H$_{35}$O[(EO)$_3$(PO)$_1$]SO$_3$K | 70/30 | 54.7 | 29 | 18 |
| 13 | sample 4 | — | C$_{16}$H$_{33}$O(EO)$_3$(BO)$_1$SO$_3$Na | 80/20 | 55.5 | 25 | 11 |
| 14 | sample 4 | — | C$_{16}$H$_{33}$O(EO)$_3$(BO)$_1$SO$_3$Na | 60/40 | 54.5 | 32 | 20 |
| 15 | sample 5 | — | C$_{12}$H$_{25}$O(EO)$_1$SO$_3$NH$_4$ | 97/3 | 54.3 | 35 | 24 |
| 16 | sample 6 | — | C$_{18}$H$_{37}$O(EO)$_2$SO$_3$Na | 90/10 | 55.4 | 26 | 12 |
| 17 | sample 6 | — | C$_{18}$H$_{37}$O(EO)$_2$SO$_3$Na | 70/30 | 55.0 | 27 | 13 |
| 18 | sample 6 | C$_{12}$H$_{25}$O(EO)$_{30}$(PO)$_{20}$H | C$_{18}$H$_{37}$O(EO)$_2$SO$_3$Na | 80/5/15 | 56.0 | 23 | 11 |
| 19 | sample 6 | C$_{12}$H$_{25}$O(EO)$_{30}$(PO)$_{20}$H | C$_{18}$H$_{37}$O(EO)$_2$SO$_3$Na | 70/20/10 | 56.8 | 18 | 6 |
| Comparative | | | | | | | |
| 20 | sample 6 | C$_{12}$H$_{25}$O(EO)$_{30}$(PO)$_{10}$H | — | — | 53.0 | 55 | 38 |
| 21 | sample 6 | C$_{12}$H$_{25}$O(EO)$_{30}$(PO)$_{10}$H | — | 30/70 | 51.2 | 70 | 42 |
| 22 | sample 6 | — | C$_{18}$H$_{37}$O(EO)$_2$SO$_3$Na | 40/60 | 52.0 | 62 | 52 |
| 23 | — | — | C$_{18}$H$_{37}$O(EO)$_2$SO$_3$Na | — | 48.3 | 107 | 78 |
| 24 | sample 7 | C$_{12}$H$_{25}$O(EO)$_{30}$(PO)$_{10}$H | — | 80/20 | 49.5 | 98 | 48 |
| 25 | sample 7 | C$_{12}$H$_{25}$O(EO)$_{10}$H | — | 70/30 | 53.4 | 48 | 33 |
| 26 | sample 3 | C$_{12}$H$_{25}$O(PO)$_5$H | — | 60/40 | 51.5 | 73 | 45 |
| 27 | sample 5 | Sorbitan trioleate | — | 90/10 | 53.2 | 53 | 43 |
| 28 | sample 8 | — | Na α-olefinsulfonate (C$_{16}$~C$_{18}$) | 80/20 | 52.2 | 68 | 55 |
| 29 | — | — | Dioctyl sulfosuccinate | — | 52.7 | 50 | 40 |
| 30 | — | HO(EO)$_{10}$(PO)$_5$(EO)$_{10}$H | C$_{12}$H$_{25}$O—C$_6$H$_4$—SO$_3$Na | — | 48.5 | 125 | 57 |
| 31 | sample 4 | — | — | — | 48.0 | 130 | 80 |
| 32 | — | C$_8$H$_{17}$—C$_6$H$_4$—O(EO)$_{10}$(PO)$_3$H | — | 70/30 | 52.5 | 55 | 41 |

TABLE 3-continued

| Deinking agent No. | Component (a) Oil or fat/polyhydric alcohol/alkylene oxide | Component (b) R—O(AO)$_n$H | R'—O(A'O)$_m$SO$_3$M | Weight ratio (a/b) | Degree of whiteness (%) | Residual ink droplet number | Unreleased ink droplet number |
|---|---|---|---|---|---|---|---|
| 33 | sample 4 | — | C$_8$H$_{16}$—⟨phenyl⟩—O(EO)$_2$(PO)$_1$SO$_3$Na | 80/20 | 51.9 | 78 | 62 |

(Notes)
EO refers to ethylene oxide, PO to propylene oxide and BO to butylene oxide.
[ ] represents the random adduct.

TABLE 4

| No. | Natural oil or fat (α) | Polyhydric alcohol (β) | Molar Ratio α/β | Alkylene oxide Compound (*1) | Molar number |
|---|---|---|---|---|---|
| 1 | Coconut oil | ethylene glycol | 1/1 | EO | 20 |
| 2 | Beef tallow | glycerol | 1/0.5 | EO | 100 |
| 3 | Beef tallow | ethylene glycol | 1/0.5 | EO/PO (block) | 50/20 |
| 4 | Soybean oil | pentaerythritol | 1/2 | EO/BO (random) | 20/5 |
| 5 | Fish oil | pentaerythritol | 1/1 | EO/PO (random) | 50/25 |
| 6 | Palm oil | glycerol | 1/0.5 | EO/PO (block) | 30/30 |

(Note)
(*1) EO refers to ethylene oxide, PO to propylene oxide and BO to butylene oxide.

TABLE 5

| | No. | Deinking agent Fatty acid (a) | Deinking agent Oil or fat/ polyhydric alcohol/AO (b) | Weight ratio (a/b) | Results Degree of whiteness (%) | Results Residual ink droplet number (number/ field of view) |
|---|---|---|---|---|---|---|
| Present invention | 1 | stearic acid | sample 1 | 50/50 | 55.0 | 35 |
| | 2 | stearic acid | sample 2 | 20/80 | 55.5 | 28 |
| | 3 | oleic acid | sample 3 | 60/40 | 55.7 | 24 |
| | 4 | oleic acid | sample 3 | 10/90 | 54.6 | 38 |
| | 5 | lauric acid | sample 4 | 70/30 | 54.4 | 41 |
| | 6 | lauric acid | sample 4 | 30/70 | 55.3 | 32 |
| Comparative | 7 | sample 2 | | — | 53.0 | 56 |
| | 8 | stearic acid | | — | 50.4 | 92 |
| | 9 | sodium dodecylbenzenesulfonate | | — | 48.5 | 110 |

EXAMPLE 4

Waste newspapers recovered in the town were cut into pieces having a size of 2×5 cm. A given amount of the pieces was placed in a bench disintegrator, to which were then added water, 1.0% of sodium hydroxide, 0.5% of sodium silicate No. 3 and 0.4% of a deinking agent shown in Table 6. After carrying out disintegration at 45° C. for 20 min while the pulp concentration was kept at 5%, the mixture was dehydrated to a pulp concentration of 18%. 1.5% of sodium hydroxide, 2.5% of sodium silicate No. 3 and 3.0% of a 30% aqueous hydrogen peroxide solution were added thereto. After mixing them, the aging treatment was effected at 55° C. for 90 min while the pulp concentration was kept at 15%. Then, water was added thereto to adjust the pulp concentration at 4%. After disintegration on the bench disintegrator for 5 min, the mixture was diluted with water to a pulp concentration of 1.0%. 1.0% of CaCl₂ was added thereto and the flotation treatment was effected at 30° C. for 10 min. After completion of the flotation, the pulp slurry was concentrated to 6%. The concentrate was diluted to 1% with water and shaped into pulp sheets with a TAPPI sheet machine. The degrees of whiteness of the obtained pulp sheets were measured with a colorimetric color-difference meter and the residual ink droplet number was determined with an image analyzer (×126). The results are summarized in Table 6.

TABLE 6

| | No. | Deinking agent Fatty acid (a) | Deinking agent Oil or fat/ polyhydric alcohol/AO (b) | Weight ratio (a/b) | Results Degree of whiteness (%) | Results Residual ink droplet number (number/ field of view) |
|---|---|---|---|---|---|---|
| Present invention | 10 | oleic acid | sample 1 | 30/70 | 54.6 | 31 |
| | 11 | oleic acid | sample 2 | 50/50 | 55.2 | 26 |
| | 12 | stearic acid | sample 5 | 60/40 | 54.8 | 30 |
| | 13 | palmitic acid | sample 5 | 30/70 | 55.0 | 28 |
| | 14 | stearic acid | sample 6 | 10/90 | 54.3 | 34 |
| | 15 | lauric acid | sample 6 | 40/60 | 55.1 | 28 |
| Comparative | 16 | oleic acid | sample 1 | 80/20 | 52.7 | 48 |
| | 17 | sample 1 | | — | 52.6 | 54 |
| | 18 | oleic acid | | — | 49.5 | 90 |
| | 19 | polyoxyethylene ($\bar{p} = 9$) nonylphenol ether | | — | 48.3 | 127 |

What is claimed is:

1. A deinking composition for reclamation of waste paper, which consists essentially of (a) a reaction product obtained by adding one or more alkylene oxides to a mixture of a natural oil or fat and a polyhydric alcohol and (b) a compound selected from the group consisting of (b-1) an alkylene oxide adduct of a higher alcohol having the formula (1):

$$R-O-(AO)_{\overline{n}}H \qquad (1)$$

in which R is an alkyl or alkenyl having 12 to 18 carbon atoms, AO are units derived from ethylene oxide or ethylene oxide and another alkylene oxide having 3 to 4 carbon atoms and n is 5 or more on the average, (b-2) a sulfate of an alkylene oxide adduct of a higher alcohol having the formula (2):

$$R'+O-A'O)_{\overline{m}} SO_3M \qquad (2)$$

in which R' is an alkyl or alkenyl having 10 to 18 carbon atoms, A'O are units derived from ethylene oxide or ethylene oxide and another alkylene oxide having 3 to 4 carbon atoms, m is from 0.3 to 5 on the average and M is hydrogen, an alkali metal or ammonium, mixtures of (b-1) and (b-2), and (b-3) a higher fatty acid having 8 to 22 carbon atoms or a salt thereof, wherein the weight ratio of (a) to (b) ranges from 99/1 to 50/50 when (b) is (b-1), (b-2) or mixtures thereof, and from 95/5 to 30/70 when b is (b-3).

2. A composition as claimed in claim 1, in which said reaction product (a) is a product obtained by adding 5 moles or more of one or more alkylene oxides to 1 mole in total of a mixture of a natural oil or fat and a polyhydric alcohol, a weight ratio of the natural oil or fat to the polyhydric alcohol ranging from 1/0.1 to $\frac{1}{5}$.

3. A composition as claimed in claim 1, which comprises (a) and (b) selected from the group consisting of (b-1) and (b-2).

4. A composition as claimed in claim 1, which comprises (a) and (b-3).

5. A composition as claimed in claim 1, in which (a) is a reaction product obtained by the block addition of ethylene oxide and propylene oxide, having a molar number of ethylene oxide to propylene oxide of 50 to 20, to a mixture of palm oil and glycerol having a molar ratio of palm oil to glycerol of 1 to 0.5 and (b) is $C_{18}H_{37}O(C_2H_4O)_{10}(C_3H_6O)_4H$, wherein the weight ratio of a to b is 70 to 30.

6. A composition as claimed in claim 1, in which n is from 20 to 100.

7. A composition as claimed in claim 1, in which (a) is a reaction product obtained by the block addition of ethylene oxide and propylene oxide, having a molar number of ethylene oxide to propylene oxide of 50 to 20, to a mixture of palm oil and glycerol having a molar ratio of palm oil to glycerol of 1 to 0.5 and (b) is $C_{12}H_{25}O(EO)_1SO_3Na$, wherein the weight ratio of a to b ranges from 90/10 to 80/20.

* * * * *

UNITED STATES PATENT AND TRADEMARK OFFICE
CERTIFICATE OF CORRECTION

PATENT NO. : 4,964,949

DATED : October 23, 1990

INVENTOR(S) : Koji HAMAGUCHI et al

It is certified that error appears in the above-identified patent and that said Letters Patent is hereby corrected as shown below:

Column 14, line 62; change "ol" to ---oil---.

Column 16, line 1; change "a weight" to ---the molar---.

Signed and Sealed this

Twelfth Day of May, 1992

Attest:

DOUGLAS B. COMER

*Attesting Officer*  *Acting Commissioner of Patents and Trademarks*